United States Patent
Nakada et al.

(10) Patent No.: US 7,904,257 B2
(45) Date of Patent: Mar. 8, 2011

(54) FLOW VERIFICATION SYSTEM AND FLOW VERIFICATION METHOD

(75) Inventors: Akiko Nakada, Kasugai (JP);
Kazutoshi Itoh, Kani (JP); Akihito Sugino, Inuyama (JP)

(73) Assignee: CKD Corporation, Komaki-shi (JP)

( * ) Notice: Subject to any disclaimer, the term of this patent is extended or adjusted under 35 U.S.C. 154(b) by 389 days.

(21) Appl. No.: 12/219,287

(22) Filed: Jul. 18, 2008

(65) Prior Publication Data
US 2009/0063059 A1 Mar. 5, 2009

(30) Foreign Application Priority Data
Aug. 29, 2007 (JP) .................. 2007-222582

(51) Int. Cl.
*G01F 1/34* (2006.01)
(52) U.S. Cl. ............... 702/47; 702/45; 73/851
(58) Field of Classification Search .......... 702/47, 702/45; 73/861; 137/488, 597, 624.27
See application file for complete search history.

(56) References Cited

U.S. PATENT DOCUMENTS
2008/0223455 A1* 9/2008 Fukuhara et al. ............ 137/488
2009/0019943 A1* 1/2009 Ozawa et al. ............... 73/861

FOREIGN PATENT DOCUMENTS
JP B2 3367811 11/2002

* cited by examiner

*Primary Examiner* — Drew A Dunn
*Assistant Examiner* — Hien X Vo
(74) *Attorney, Agent, or Firm* — Oliff & Berridge, PLC

(57) ABSTRACT

A flow verification system is adapted to verify flow characteristics just after a flow control device starts flow control by verifying a flow rate in a gas piping system which includes a first cutoff valve, the flow control device installed downstream from the first cutoff valve, and a pressure sensor for measuring pressure downstream from the flow control device, flow verification is made based on the pressure measured by the pressure sensor. The flow verification system also includes a benchmark storage device for storing a benchmark which is calculated by integrating the pressure values measured by the pressure sensor during a normal flow control operation, and an abnormality detection device for detecting an abnormal flow of process gas.

4 Claims, 5 Drawing Sheets

FLOW VERIFICATION SYSTEM AND FLOW VERIFICATION METHOD

CROSS-REFERENCE TO RELATED APPLICATIONS

This application is based upon and claims the benefit of priority from each of the prior Japanese Patent Application No. 2007-222582 filed on Aug. 29, 2007, the entire contents of which are incorporated herein by reference.

BACKGROUND OF THE INVENTION

1. Field of the Invention

The present invention relates to a flow verification system and a flow verification method of examining the flow characteristics of a flow controller installed in a gas piping system used in, for example, semiconductor manufacturing equipment.

2. Description of Related Art

For example, film deposition and dry etching apparatuses of the semiconductor manufacturing equipment use so-called special material gases such as silane and phosphine, corrosive gases such as chlorine gas and highly flammable gases such as hydrogen gas. Flow rates of these gases are very strictly controlled for the following reasons: their flow rates directly have an influence on whether a process is successful or not, cost for removing a device installed in the exhaust system is involved, and the gases themselves are expensive, and so on. Since the quantity of gas actually used in the process is at most 500 sccm or so, a known mass flow controller is installed in the piping so as to optimize the flow rate depending on the type of gas and process recipe. In the mass flow controller, flow rates are set by adjusting the applied voltage.

Among process gases, deposition material gases may cause precipitation of solid substances due to their properties, resulting in a change in a flow capacity. Particularly, the mass flow controller is more likely to cause precipitation of solid substances in its inner small tubes than other components and if such precipitation should occur, the flow capacity would be seriously affected. A change in the flow capacity will inevitably change the relationship between the applied voltage and actual flow rate and in that case, even when the flow rate setting remains unchanged, the actual flow rate will change, leading to deterioration in process stability. If the flow capacity has actually changed, a preset value of voltage to be applied must be modified in order to keep the gas flow rate adequate. For this reason, the flow rate of the mass flow controller must be verified.

The flow rate of the mass flow controller is basically verified using a film flow meter. However, in this method, some part of the piping must be removed and after measurement work, it is replaced as it was and checked for leakage. This procedure is troublesome. As one solution to this, Japanese Patent No. 3367811 proposes a method in which the flow rate is verified without removing any pipes.

FIG. 5 shows a configuration of a gas system 100 to which a flow verification system 110 as described in Japanese Patent No. 3367811 is applied.

In the gas system 100, gas lines 101A and 101B converge into a gas supply line 102, which is connected with a processing tank 103. The flow verification system 110 verifies a flow rate of process gases A and B under the control of mass flow controllers 105A and 105B, based on pressure measured by a pressure sensor 108.

In the gas lines 101A and 101B, first cutoff valves 104A and 104B, the mass flow controllers 105A and 105B, and second cutoff valves 106A and 106B are provided in order from upstream respectively. A final cutoff valve 107 is provided in the gas supply line 102 and the pressure sensor 108 and a vent line 109 are located upstream from the final cutoff valve 107. The pressure sensor 108 is connected with the flow verification system 110 to issue a pressure detection signal. Opening and closing of the final cutoff valve 107 are controlled by the flow verification system 110 or a host device 111 connected with the flow verification system 110.

The flow verification system 110 specifies an initial rate of pressure variation for each of the mass flow controllers 105A and 105B immediately after assembling a piping system or replacing the mass flow controllers, as follows.

For example, in specifying an initial rate of pressure variation for the mass flow controller 105A, the flow verification system 110 first opens the first cutoff valve 104A and the second cutoff valve 106A of the gas line 101A and the final cutoff valve 107 of the gas supply line 102, with the second cutoff valve 106B of the gas line 101B closed. The pressure downstream from the mass flow controller 105A is decreased using a vacuum pump or similar device (not shown) connected with the processing tank 103.

After that, the final cutoff valve 107 is closed to cut off the flow of exhaust air to the processing tank 103. At this time, the first and second cutoff valves 104A and 106A are opened and thus the flow rate of the process gas A is controlled by the mass flow controller 105A and the gas A is introduced into a line portion between the mass flow controller 105A and the final cutoff valve 107. Consequently, pressure measured by the pressure sensor 108 gradually increases. The flow verification system 110 samples the pressure measured by the pressure sensor 108 at regular time intervals and calculates a gradient in the pressure variation range with the good linearity by the least square method. The flow verification system 110 stores this gradient as an initial value.

If the process gas A is used for flow verification, the flow verification system 110 samples the pressure measured by the pressure sensor 108 at the regular time intervals with the same procedure as above and calculates the gradient in the pressure variation range with the good linearity by the least square method. The calculated gradient is compared with the initial value. If the calculated gradient does not indicate a change from the initial value, the flow verification system 110 determines that the flow characteristics of the mass flow controller 105A are unchanged (normal). On the contrary, if the calculated gradient indicates a change from the initial value, it determines that the flow characteristics of the mass flow controller 105A have changed and the mass flow controller 105A is out of order.

However, in the conventional flow verification system 110, just after the mass flow controller 105A starts flow control of the process gas A, the pressure unstably varies depending on the flow rate. Therefore, the conventional flow verification system 110 waits a few seconds after the mass flow controller 105A starts the flow control and it is only after the flow is stabilized that it can calculate the gradient in the pressure variation range with the good linearity for the flow verification.

In an actual film deposition process, as soon as the first cutoff valve 104A is opened and the process gas A is introduced into the processing tank 103, a film deposition cycle is started. If one deposition cycle requires 5 to 6 seconds, the process gas A supplied to a wafer initially (for example, one second after start of the flow control by the mass flow controller 105A) largely affects the deposited film quality. For this reason, there has been strong demand for a system which starts flow verification just after the mass flow controller 105A starts flow control, but the conventional flow verification system has not satisfied this demand.

SUMMARY OF THE INVENTION

The present invention has been made in view of the above circumstances and has an object to overcome the above problems to provide a flow verification system and a flow verification method to verify flow characteristics of a flow controller just after it starts flow control.

To achieve the purpose of the invention, there is provided a flow verification system for verifying a flow rate in a gas piping system including a first cutoff valve, a flow control device installed downstream from the first cutoff valve, and a pressure sensor for measuring pressure downstream from the flow control device, the flow verification system being adapted to verify the flow (rate) based on the pressure measured by the pressure sensor. The flow verification system comprises a benchmark storage device for storing a benchmark which is calculated by integrating the pressure values measured by the pressure sensor during a normal operation of the flow control device and an abnormality detection device for detecting an abnormal flow of process gas by integrating the pressure values measured by the pressure sensor to calculate a pressure integrated value and comparing the pressure integrated value with the benchmark when the process gas is supplied to the flow control device through the first cutoff valve, controlled in flow rate by the flow control device, and supplied to the pressure sensor.

According to another aspect of the invention, a flow verification method of verifying a flow rate in a gas piping system includes a first cutoff valve, a flow control device installed downstream from the first cutoff valve, and a pressure sensor for measuring pressure downstream from the flow control device, the flow verification method being arranged to verify the flow rate based on the pressure measured by the pressure sensor. The flow verification method comprises an integrated pressure value calculation step of integrating the pressure values measured by the pressure sensor to calculate a pressure integrated value when the process gas is supplied to the flow control device through the first cutoff valve and controlled in flow rate by the flow control device, a comparison step of comparing the integrated pressure value calculated in the integrated pressure value calculation step with a benchmark calculated by integrating the pressure values measured by the pressure sensor during a normal operation of the flow control device, and an abnormality detection step of detecting abnormality in the flow rate based on a comparison result in the comparison step.

DETAILED DESCRIPTION OF THE PREFERRED EMBODIMENTS

A detailed description of a preferred embodiment of a flow verification system and a flow verification method embodying the present invention will now be given referring to the accompanying drawings.

<General Configuration of a Gas Supply System>

Figure 1:
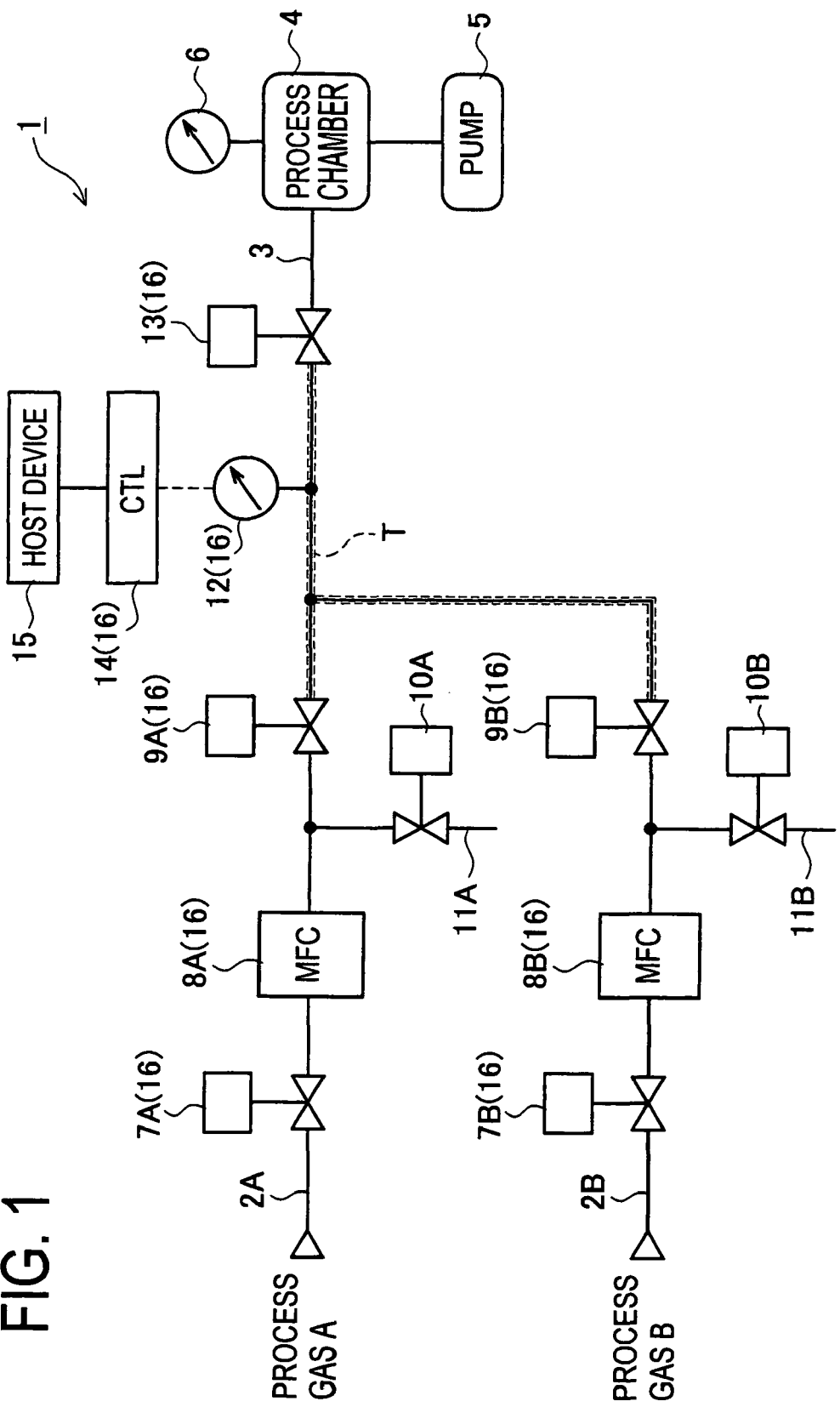
FIG. 1 shows a configuration of a gas supply system according to an embodiment of the present invention.

FIG. 1 shows a configuration of a gas supply system 1 according to an embodiment of the present invention.

In the gas supply system 1, gas lines 2A and 2B to which process gases A and B are supplied respectively to converge into a gas supply line 3, which is connected with a process chamber 4. A flow verification system 16, which is applied to the gas supply system 1, starts verifying flow rate of a mass flow controller 8A as a flow control device for process gas A and that of a mass flow controller 8B as a flow control device for process gas B, using integrated pressure values calculated by integration of pressure measured by a pressure sensor 12, just after the mass flow controllers 8A and 8B start flow control.

The process chamber 4 is a CVD apparatus for making a deposition on a semiconductor wafer, an etching apparatus for etching a semiconductor wafer or similar apparatuses. Process gases for CVD include silane (SiH), phosphine ($PH_3$), and tungsten hexafluoride ($WF_6$), and process gases for etching include chlorine gas ($Cl_2$) and hydrogen bromide gas (HBr). The process chamber 4 is depressurized by a vacuum pump 5 and its internal pressure is detected by a pressure sensor 6.

In the gas lines 2A and 2B, first cutoff valves 7A and 7B, mass flow controllers 8A and 8B, and second cutoff valves 9A and 9B are provided in order from upstream respectively. A vent line 11A (11B) diverges from the gas line 2A (2B) between the mass flow controller 8A (8B) and the second cutoff valve 9A (9B) and a third cutoff valve 10A (10B) is located in the vent line 11A (11B), so that excessive process gas A (B) is exhausted without being passed through the process chamber 4.

The first to third cutoff valves 7A, 7B, 9A, 9B, 10A, 10B are air-operated valves which are opened and closed by supplying operating air. The mass flow controllers 8A and 8B control the flow rates of the process gases A and B according to the applied voltage respectively. Downstream from the second cutoff valves 9A and 9B, the gas lines 2A and 2B converge into the gas supply line 3 which is connected with the process chamber 4. The pressure sensor 12 and a final cutoff valve 13 are located in the gas supply line 3 in order from upstream.

In this embodiment, the flow verification system 16 includes the first cutoff valves 7A and 7B, the mass flow controllers 8A and 8B, the second cutoff valves 9A and 9B, the pressure sensor 12, the final cutoff valve 13 and a controller 14 where the controller 14 controls a benchmark setting operation and a flow rate verifying operation. The controller 14 is connected with a host device 15 in a way to allow telecommunications between them. In the flow verification system 16, a detection tank T for pressure detection by the pressure sensor 12 is provided in an interior channel which is defined by connecting the second cutoff valves 9A and 9B and the final cutoff valve 13.

The host device 15 is a microcomputer which controls the whole gas supply system 1 and includes such devices in the public domain as a CPU, ROM, and RAM. The first to third cutoff valves 7A, 7B, 9A, 9B, 10A and 10B and the final cutoff valve 13 open and close according to commands from the host device 15. The mass flow controller 8A (8B) is supplied with the applied voltage from the host device 15 and controls process gas A (B) depending on the voltage while processing is under way. The pressure sensor 6 sends pressure measurements of the process chamber 4 to the host device 15. The vacuum pump 5 is connected with the host device 15 so that its vacuum operation is controlled.

<Electrical Block Diagram of the Controller>

Figure 2:
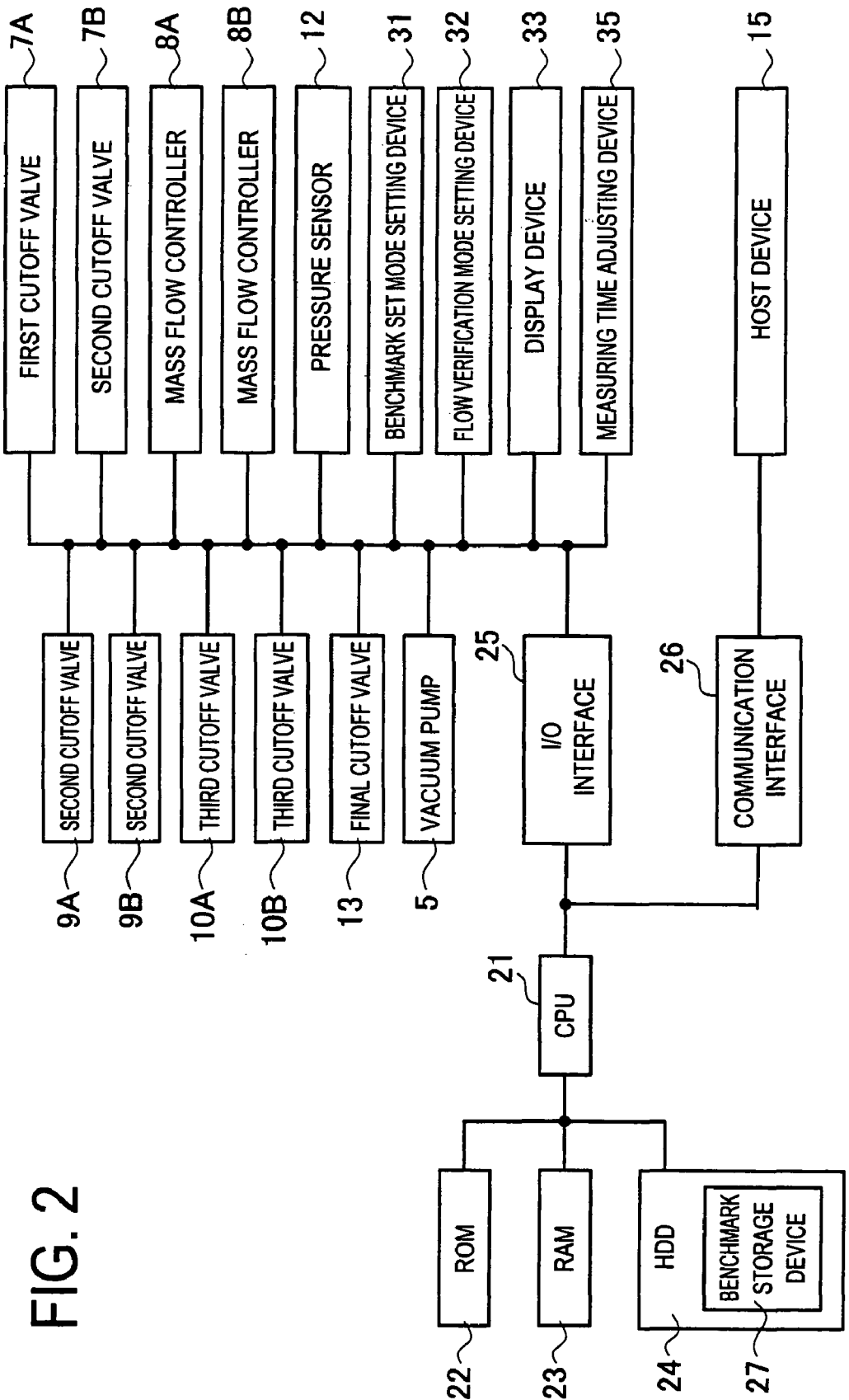
FIG. 2 is an electrical block diagram of a controller shown in FIG. 1.

FIG. 2 is an electrical block diagram of the controller 14 shown in FIG. 1.

The controller 14 is a microcomputer which controls flow verification and includes CPU 21, ROM 22, RAM 23, HDD 24, I/O interface 25 and communication interface 26 which are in the public domain.

HDD 24 has a benchmark storage device 27 to store a benchmark. Here a "benchmark" is a value used as a standard when a decision about abnormality is made in verification of flow characteristics of the mass flow controllers 8A and 8B. A "benchmark" is stored in the benchmark storage device 27 when the controller 14 is set to the "benchmark set mode" which will be described later.

The I/O interface 25 is connected with the first cutoff valves 7A and 7B, mass flow controllers 8A and 8B, second cutoff valves 9A and 9B, third cutoff valves 10A and 10B, pressure sensor 12, final cutoff valve 13 and vacuum pump 5 so that the controller 14 controls operation of these flow control devices during the flow verification. The I/O interface 25 is also connected with a benchmark set mode setting device 31, flow verification mode setting device 32, display device 33, and measuring time adjusting device 35.

The benchmark set mode setting device 31 sets a "benchmark set mode."

The flow verification mode setting device 32 sets a "flow verification mode" in which the flow characteristics of the mass flow controller 8A (8B) are verified.

The display device 33 shows the operational state of the controller 14. The display device 33 may be, for example, a liquid crystal panel which shows messages or LEDs which flicker to notify that the benchmark set mode or flow verification mode is ON or OFF and warn of an abnormal flow rate.

The measuring time adjusting device 35 adjusts, for each of the gas lines 2A and 2B, the pressure measuring time during which pressure values necessary for flow verification are measured by the pressure sensor 12.

The communication interface 26 is connected with the host device 15. The communication interface 26 controls data transmission to, and data reception from, the host device 15. The controller 14 receives and monitors command signals from the host device 15 to be sent to the first to third cutoff valves 7A, 7B, 9A, 9B, 10A and 10B and the final cutoff valve 13 through the communication interface 26.

<Relation Between Integrated Pressure Value and Flow Rate>

Figure 3:
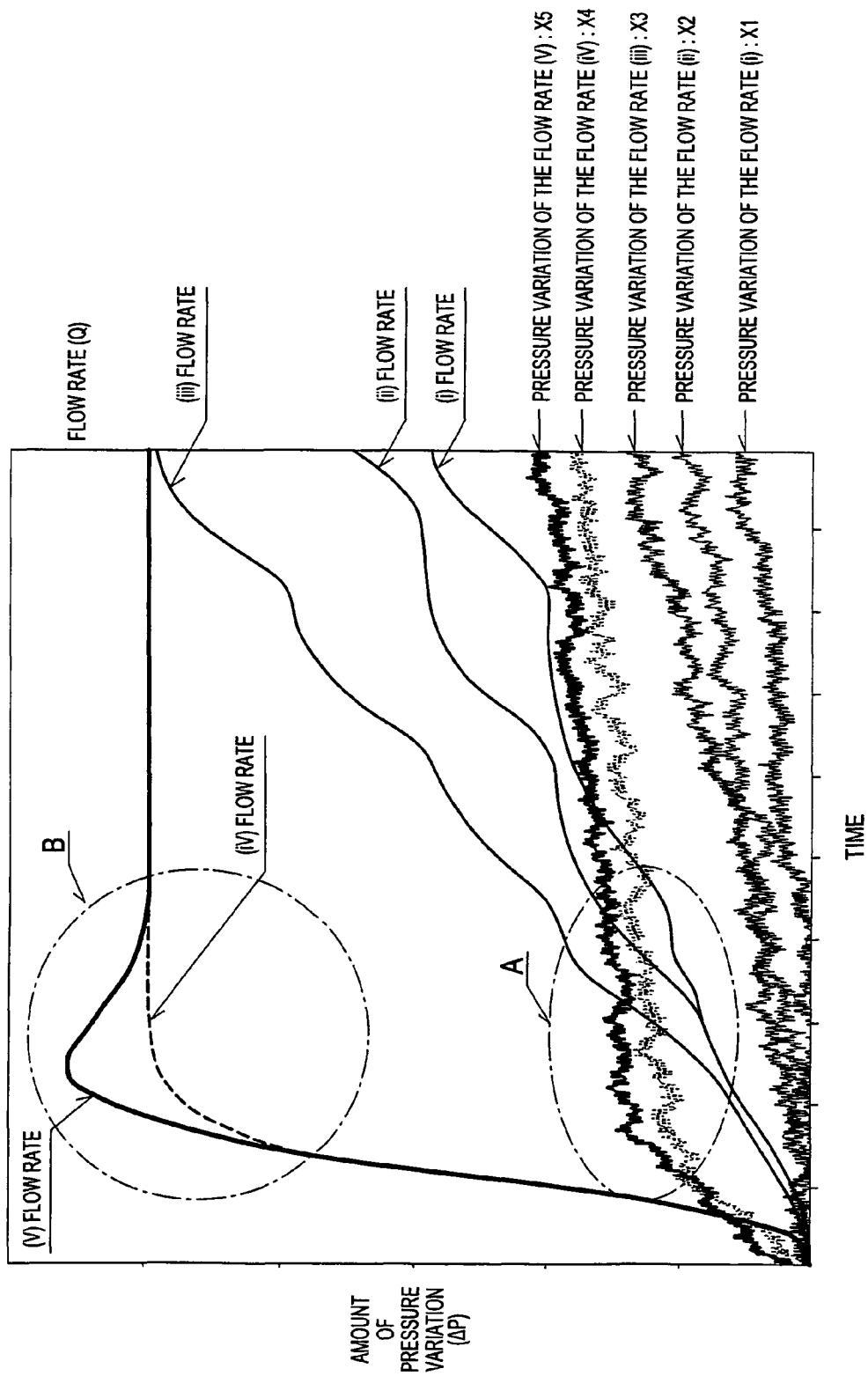
FIG. 3 shows changes over time in output flow rates just after start of flow control by a mass flow controller of FIG. 1 and in pressure measured by a pressure sensor of FIG. 1 just after start of the flow control by the mass flow controller. A horizontal axis represents time and a left vertical axis represents amount of pressure variation ($\Delta P$) and a right vertical axis flow rate (Q).
Figure 4:
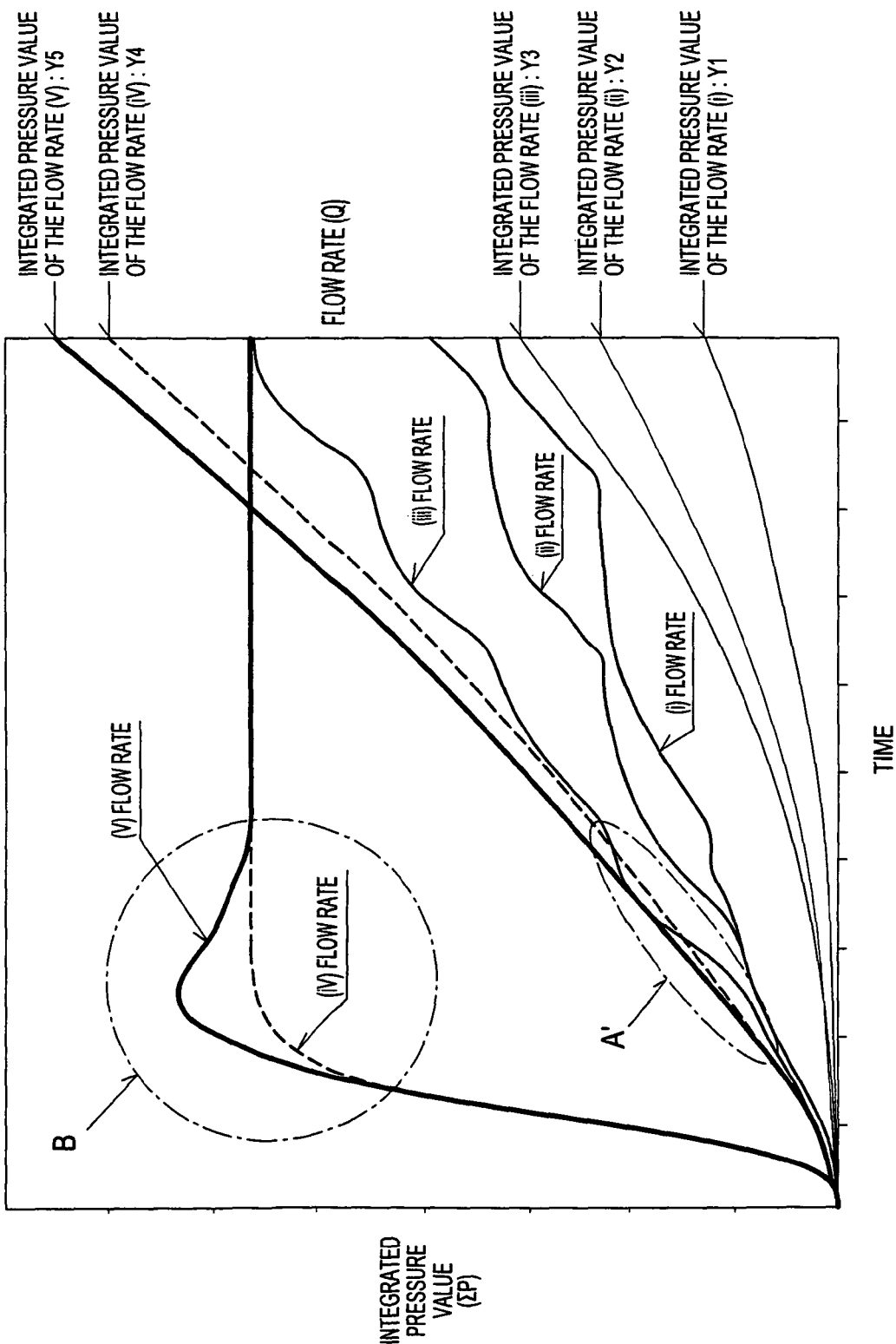
FIG. 4 shows the relation between the flow rate (Q) in FIG. 3 and integrated pressure value ($\Sigma p$) which is calculated by the measured pressure shown in FIG. 3. The horizontal axis represents time, the left vertical axis integrated pressure value ($\Sigma p$) and the right vertical axis the flow rate (Q).
Figure 5:
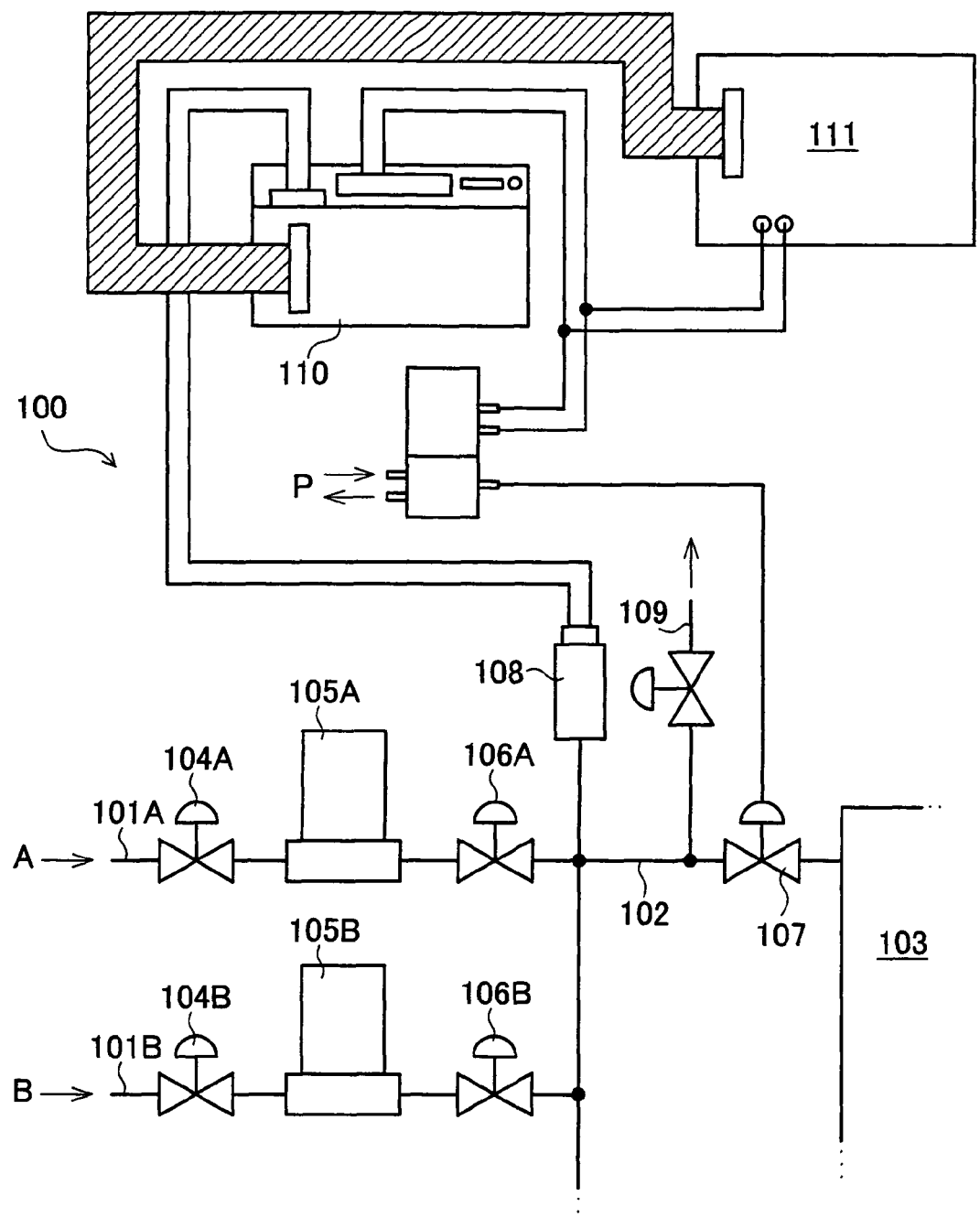
FIG. 5 shows a configuration of a conventional gas system to which a flow verification system is applied.

FIG. 3 shows changes over time in output flow rates just after start of flow control by the mass flow controller 8A (FIG. 1) and in pressure measured by the pressure sensor 12 (FIG. 1) just after start of flow control by the mass flow controller 8A. The horizontal axis represents time and the left vertical axis represents the amount of pressure variation ($\Delta P$) and the right vertical axis flow rate (Q). FIG. 4 shows the relation between flow rate (Q) in FIG. 3 and integrated pressure value in FIG. 3 ($\Sigma p$). The horizontal axis represents time, the left vertical axis integrated pressure value ($\Sigma p$) and the right vertical axis flow rate (Q).

FIGS. 3 and 4 both indicate the flow rate (Q), pressure variation ($\Delta P$), and integrated pressure value ($\Sigma p$) in part of the pressure measuring time (for example, 5 to 6 seconds equivalent to film deposition time), namely in one second just after a voltage is supplied to the mass flow controller 8A and the mass flow controller 8A starts flow control.

The flow verification system 16 verifies the flow rates of the mass flow controllers 8A and 8B using the integrated pressure values calculated by integrating pressure measured by the pressure sensor 12. More specifically, in the flow verification, the flow verification system 16 calculates an integrated pressure value, and compares the calculated integrated pressure value with the benchmark stored in the benchmark storage device 27 and, if the difference is within an allowable range, decides that the flow characteristics of the mass flow controller have not changed from the normal ones (normal) and if the difference is not within the allowable range, decides that the flow characteristics of the mass flow controller have changed from the initial ones (abnormal). Here, the allowable range means a range of deviation from the benchmark which is allowed. The allowable range can be freely specified depending on the desired flow verification accuracy. In other words, for lower flow verification accuracy, a larger deviation from the benchmark should be allowed or the allowable range should be increased, and for higher flow verification accuracy, a smaller deviation from the benchmark should be allowed or the allowable range should be decreased.

As indicated by pressure variations X1 to X5 in FIG. 3, the pressure unstably varies depending on the corresponding flow rates (i) to (v). Unstable pressure variation continues until the flow rates (i) to (v) are reached; therefore, it is impossible to make a flow verification based on the pressure gradient when the flow rate is unstable, namely just after the mass flow controller 8A starts flow control.

On the other hand, integrated pressure values Y1 to Y5 shown in FIG. 4, which correspond to the pressure variations X1 to X5, are obtained by integrating pressure values sampled at regular time intervals as indicated by the pressure variations X1 to X5 and mapping them. The integrated pressure values Y1 to Y5 increase with variation in flow capacity (integrated flow value) and do not vary unstably with flow rates (i) to (v) but vary almost stably.

Therefore, by comparing the integrated pressure value in the flow verification with normal integrated pressure value (benchmark), how the flow characteristics of the mass flow controllers 8A and 8B have changed from the normal ones can be determined.

<Description of Regular Operation>

The flow verification system 16 allows regular operation of the gas supply system 1 while the benchmark set mode or flow verification mode is not selected. Regular operation here refers to the process of performing a film deposition on a wafer or etching a wafer or similar process in the process chamber 4.

Next, regular operation will be described by taking as an example a case that the gas supply system 1 supplies the process gas A to the process chamber 4 at a given flow rate to perform a film deposition on a wafer. Even when the process gas B is used for film deposition, the sequence is the same.

In the gas supply system 1, the first and second cutoff valves 7B and 9B in the gas line 2B are closed to prevent process gas A from entering the gas line 2B. Then, the third cutoff valve 10A in the gas line 2A is closed to close the vent line 11A to prevent discharge of the process gas A.

Then, in the gas supply system 1, the first and second cutoff valves 7A and 9A in the gas line 2A as well as the final cutoff valve 13 in the gas supply line 3 are opened and the process gas A whose flow rate is controlled by the mass flow controller 8A is supplied to the process chamber 4. Since the time for which the process gas A flows from the mass flow controller 8A to the process chamber 4 is very short or several milliseconds, a lag between the time of start of the flow control by the mass flow controller 8A and the time of supply of the process gas A to the process chamber 4 is negligible. Therefore, as soon as a voltage is supplied to the mass flow controller 8A and the flow control by the mass flow controller 8A is started, a film deposition or etching process is started.

<Flow Verification Method>

In this embodiment, a flow verification is made as follows: when the process gas A (B) which has been supplied to the mass flow controller 8A (8B) through the first cutoff valve 7A (7B) and whose flow rate has been controlled by the mass flow controller 8A (8B) is sent to the pressure sensor 12, pressure measured by the pressure sensor 12 are integrated to calculate an integrated pressure value (step of calculating an integrated pressure value), then the integrated pressure value is compared with a "benchmark" (step of comparison), then whether or not there is any flow abnormality is decided based on the result of the comparison (step of checking for an abnormality).

<Flow Verification Operation>

The user selects the "flow verification mode" using the flow verification mode setting device 32, for example, before starting the semiconductor manufacturing equipment. By doing so, the controller 14 makes flow verifications for the mass flow controllers 8A and 8B installed in the gas supply system 1 successively. Next, the procedure of verifying the flow rates of the mass flow controller 8A will be described. The procedure of verifying the flow rates of the mass flow controller 8B is the same.

The controller 14 first closes the second cutoff valve 9B in the gas line 2B to prevent the process gas A from entering the gas line 2B. Then, the controller 14 opens the first cutoff valve 7A in the gas line 2A and the final cutoff valve 13 in the gas supply line 3 and closes the second cutoff valve 9A in the gas line 2A. Consequently, the flow paths downstream from the second cutoff valves 9A and 9B are connected with the process chamber 4 and vacuumed and depressurized by activating the vacuum pump 5.

The pressure on the downstream from the second cutoff valves 9A and 9B is detected by the pressure sensor 12. When the controller 14 confirms, based on measurements taken by the pressure sensor 12, that the flow paths downstream from the second cutoff valves 9A and 9B are depressurized to a prescribed pressure level, it closes the final cutoff valve 13. In this case, the detection tank T as indicated by a dotted line in FIG. 1 is depressurized to a prescribed pressure level.

After that, the controller 14 supplies the same voltage to the mass flow controller 8A as when processing is performed. Then, the controller 14 opens the second cutoff valve 9A to introduce the process gas A whose flow rate is controlled by the mass flow controller 8A, into the detection tank T. When a prescribed pressure measuring time (for example, 3 sec) has elapsed after the time of voltage supply to the mass flow controller 8A as reference time (0 sec), the second cutoff valve 9A is closed to end measuring operation.

The controller 14 acquires pressure measured by the pressure sensor 12 at regular time intervals until the prescribed pressure measuring time elapses. The controller 14 integrates pressure values acquired from the pressure sensor 12 to calculate an integrated pressure value and stores it in the RAM 23. The controller 14 may calculate the integrated pressure value and store it in the RAM 23 each time it acquires a pressure value from the pressure sensor 12 or may calculate the integrated pressure value for each time of pressure value acquisition (sampling time) after elapse of the pressure measuring time and store it in the RAM 23.

The controller 14 reads the "benchmark" for the mass flow controller 8A from the benchmark storage device 27 and copies it into the RAM 23. The controller 14 then compares the calculated integrated pressure value with the "benchmark" read from the benchmark storage device 27 for each sampling time and calculates the difference. Comparison of the calculated integrated pressure value with the "benchmark" read from the benchmark storage device 27 may be made at each time of calculation of the integrated pressure value or made through tabularization or mapping after calculation of all the integrated pressure values within the pressure measuring time.

If the calculated difference is within the allowable range, the controller 14 decides that the flow characteristics of the mass flow controller 8A have not changed, namely, the mass flow controller 8A is normal. In this case, the controller 14 sends an OK signal to the host device 15. At the same time, the controller 14 shows on the display device 33 that the mass flow controller 8A is normal, in order to notify the user that it is unnecessary to replace or repair the mass flow controller 8A.

Having received the OK signal from the controller 14, the host device 15 supplies the applied voltage to the mass flow controller 8A without changing, and regular operation is performed.

On the other hand, if the difference is not within the allowable range, the controller 14 decides that the flow characteristics of the mass flow controller 8A have changed or the mass flow controller 8A is out of order. In this case, the controller 14 sends an abnormality detection signal to the host device 15. The abnormality detection signal includes information required to adjust the flow characteristics of the mass flow controller 8A, such as the result of comparison of the integrated pressure value calculated for the flow verification with the "benchmark" and abnormal flow data.

At the same time, the controller 14 shows on the display device 33 that the mass flow controller 8A is out of order, in order to notify the user that there is an abnormality.

The host device 15 analyzes the abnormality detection signal received from the controller 14 and adjusts the voltage to be applied to the mass flow controller 8A so as to make the flow characteristics of the mass flow controller 8A coincide with the initial flow characteristics. In regular operation, the host device 15 supplies the adjusted voltage to the mass flow controller 8A to perform processing such as film deposition.

In the period from the start of the "flow verification mode" until the end of the flow verification, the controller 14 shows on the display device 33 that the flow verification is under way. This prevents the user from selecting the "benchmark set mode" or starting regular operation of the gas supply system 1 during the flow verification.

In the procedure described above, the pressure measuring time is set to 3 seconds. However, the rate of variation of pressure which is measured by the pressure sensor 12 may differ between the mass flow controllers 8A and 8B, or depending on the gas line length, specific gravity of the process gas (A, B) and the flow rate. If that is the case, it is desirable that using the measuring time adjusting device 35, the pressure measuring time for each of the mass flow controllers 8A and 8B to be adjusted depending on the gas piping structure and properties of the process gas (A, B). Thereby, the controller 14 can reliably monitor the pressure in the detection tank T detected by the pressure sensor 12 just after the mass flow controller (8A, 8B) starts flow control until the gradient of pressure rise becomes constant.

For example, since the gas line 2B is longer than the gas line 2A, the rate of pressure variation in flow verification with the mass flow controller 8B is lower than that in flow verification with the mass flow controller 8A. In this case, the pressure measuring time for flow verification with the mass flow controller 8B should be longer than that with the mass flow controller 8A so that the pressure variation monitoring time is longer.

Also, if the specific gravity of process gas A is larger than that of process gas B, process gas A is less easy to flow than process gas B. In this case, the pressure measuring time for flow verification with the mass flow controller 8A should be longer than that with the mass flow controller 8B so that the pressure variation monitoring time is longer.

If the flow rate of process gas A is lower than that of process gas B, the pressure variation of process gas A is lower than that of process gas B. In this case, the pressure measuring time for flow verification with the mass flow controller 8A should be longer than that with the mass flow controller 8B so that the pressure variation monitoring time is longer.

<Benchmark Setting Operation>

The benchmark used for the flow verification is calculated by the controller 14 before flow verification operation is started, and stored in the benchmark storage device 27 for each of the mass flow controllers 8A and 8B. The procedure of calculating and storing a "benchmark" for the mass flow controller 8A is described below. The procedure of calculating and storing a "benchmark" for the mass flow controller 8B is the same as for the mass flow controller 8A.

When installing the mass flow controller 8A (8B) in the gas line 2A (2B) during the gas piping system assembling work or the replacement of the mass flow controller 8A (8B), the user operates the benchmark set mode setting device 31 of the controller 14 to set the controller 14 to the "benchmark set mode."

As in the above flow verification operation, the controller 14, which has been set to the "benchmark set mode," lets the pressure sensor 12 measure the pressure in the detection tank T while the mass flow controller 8A controls the flow rate of the process gas A, and calculates an integrated pressure value by integration of pressure values acquired from the pressure sensor 12. Then, the controller 14 stores the integrated pressure value in the benchmark storage device 27 as a "benchmark" for the mass flow controller 8A.

Here, an alternative approach is that each time the controller 14 acquires the pressure values from the pressure sensor 12, it calculates an integrated pressure value and stores such integrated pressure values in the benchmark storage device 27 successively.

It is also possible that the controller 14 temporarily stores in the RAM 23 the pressure values acquired from the pressure sensor 12 during the pressure measuring time, and calculates an integrated pressure value for each sampling time after elapse of the pressure measuring time and stores such integrated pressure values in a tabular or mapped form in the benchmark storage device 27.

In the period from when the "benchmark set mode" is selected until benchmark setting is completed, the controller 14 shows on the display device 33 that benchmark setting operation is under way. Looking at the display device 33, the user can know that the controller 14 is not ready for the flow verification or the gas supply system 1 cannot do regular operation.

The "benchmark" is calculated for each of the mass flow controllers 8A and 8B and stored in the benchmark storage device 27. This is because the pressure measured by the pressure sensor 12 differ between the mass flow controllers 8A and 8B, depending on the length of the gas line (2A, 2B), specific gravity of the process gas (A, B) and the flow rate, and also the integrated pressure value (benchmark) differs between the mass flow controllers 8A and 8B.

Concrete Examples

Let's assume that the mass flow controller 8A demonstrates the flow characteristics as indicated by the flow rate (iv) in FIG. 3 when the piping system is assembled (normal operation). As the user installs a normal mass flow controller 8A in the gas line 2A and selects the "benchmark set mode," the controller 14 makes flow verification. In the period from when the controller 14 supplies the applied voltage to the mass flow controller 8A and lets the mass flow controller 8A start flow control until the pressure measuring time (3 seconds in this case) elapses, it acquires pressure values from the pressure sensor 12 at regular time intervals. The pressure waveform in this case is expressed by pressure variation X4 in FIG. 3.

The controller 14 integrates pressure values as indicated by pressure variation X4 in FIG. 3 for each sampling time and stores the calculated integrated pressure value in the benchmark storage device 27 as a benchmark. One example of a benchmark is integrated pressure value Y4 in FIG. 4.

After that, as the user selects the "flow verification mode" of the controller 14, the controller 14 makes flow verification. In the period from when the controller 14 supplies the applied voltage to the mass flow controller 8A and lets the mass flow controller 8A start the flow control until the pressure measuring time (3 seconds in this case) elapses, it acquires pressure values from the pressure sensor 12. One example of the pressure waveform in this case is pressure variation X5 in FIG. 3.

The controller 14 integrates pressure values as indicated by the pressure variation X5 in FIG. 3 for each sampling time and calculates an integrated pressure value. The calculated integrated pressure value is expressed in a mapped form by integrated pressure value Y5 in FIG. 4. The controller 14 reads integrated pressure value Y4 in FIG. 4 as a benchmark from the benchmark storage device 27 and compares the integrated pressure value Y5 calculated for the flow verification with it.

Comparison between the integrated pressure values Y4 and Y5 in FIG. 4 reveals that the difference gradually increases in the zone marked by A' in the figure. The zone where the difference increases corresponds to an overshoot of the flow rate (v) in the flow verification from the normal flow rate (iv).

Therefore, by comparison between the integrated pressure values Y4 and Y5, it is possible to determine whether or not the flow rate in the flow verification indicates a change from the normal flow rate level even in several seconds from just after the mass flow controller 8A starts the flow control until the flow rate becomes stable.

<Effects>

As explained so far, according to the flow verification system 16 and flow verification method in this embodiment, in verifying the flow characteristics of the mass flow controller 8A, the second cutoff valve 9B in the gas line 2B and the final cutoff valve 13 are closed and the first and second cutoff valves 7A and 9A in the gas line 2A are opened to supply process gas A upstream from the mass flow controller 8A and process gas A whose flow rate is controlled by the mass flow controller 8A is supplied to the pressure sensor 12. The pressure sensor 12 measures the pressure downstream from the mass flow controller 8A. Since the pressure measured by the pressure sensor 12 varies depending on the flow rate (see FIG. 3), pressure values acquired from the pressure sensor 12 are integrated to smooth pressure fluctuations (see FIG. 4). Variation in the integrated pressure value indicates variation in the integrated flow value, which then indicates variation in the flow rate (see FIG. 4). This means that the flow rates can be verified based on the integrated pressure values.

The benchmark storage device 27 stores, as a benchmark, the integrated pressure value calculated by integrating the pressure measured by the pressure sensor 12 when the mass flow controller 8A used for flow control functions normally. In verifying the flow rates of the mass flow controller 8A, the integrated pressure value calculated by integration of pressure measured by the pressure sensor 12 is compared with the benchmark stored in the benchmark storage device 27 to investigate how the integrated pressure value indicates a change from the benchmark. In other words, how the flow rate of the mass flow controller 8A has changed from the normal flow rate level is investigated to check for any abnormality in the flow characteristics of the mass flow controller 8A.

Therefore, according to the flow verification system 16 and flow verification method in this embodiment, the flow characteristics of the mass flow controller 8A can be verified in the initial stage of the flow control where the flow rate and pressure are unstable, or just after the mass flow controller 8A starts the flow control.

In the flow verification system 16 and flow verification method in this embodiment, a small-capacity detection tank T is provided between the second cutoff valves 9A and 9B and the final cutoff valve 13 and the flow verification is made by measuring the pressure in the detection tank T by the pressure sensor 12, so that the pressure measured by the pressure sensor 12 is stabilized in a short time and thus the flow verification time is shortened.

In the flow verification system 16 in this embodiment, when the mass flow controller 8A is installed in the gas piping system, as the "benchmark set mode" is selected using the benchmark set mode setting device 31, process gas A is supplied to the mass flow controller 8A installed in the gas piping system and a benchmark is calculated by integrating the pressure measured by the pressure sensor 12 and stored in the benchmark storage device 27. Therefore, according to the flow verification system 16 in this embodiment, a benchmark can be determined depending on the condition of use of the mass flow controller 8A (8B) installed in the gas piping system and flow verification accuracy can be improved.

In the flow verification system 16 of this embodiment, two gas lines 2A and 2B which include the first cutoff valves 7A and 7B and mass flow controllers 8A and 8B are connected with the pressure sensor 12. In flow verification, the pressure sensor 12 measures the pressure for each of the gas lines 2A and 2B. The pressure measured by the pressure sensor 12 may differ between the gas lines 2A and 2B, depending on the distance from the mass flow controller (8A, 8B) in the gas line (2A, 2B) to the pressure sensor 12, specific gravity and flow rate of process gas (A, B) flowing in the gas line (2A, 2B). Even if that is the case, according to the flow verification system 16 in this embodiment, the pressure in each of the gas lines 2A and 2B can be properly monitored by adjusting the pressure measuring time for each gas line depending on the gas piping structure and the properties of process gas, using the measuring time adjusting device 35.

The present invention may be embodied in other specific forms without departing from the spirit or essential characteristics thereof.

(1) In the above embodiment, mass flow controllers 8A and 8B are used as flow control devices. Alternatively, anything that can control flow rates, such as a mass flow manometer, may be used instead of the mass flow controllers 8A and 8B.

(2) In the above embodiment, an interior channel defined by connecting the second cutoff valves 9A and 9B with the final cutoff valve 13 constitutes the detection tank T. Alternatively, a detection tank may be provided between the second cutoff valves 9A and 9B and the final cutoff valve 13 as a member separate from the pipe line and a pressure sensor 12 is installed in the detection tank.

(3) In the above embodiment, the final cutoff valve 13 is located downstream from the pressure sensor 12; however, the pressure sensor 12 and final cutoff valve 13 are omissible. If they are omitted, the process chamber 4 performs the same function as the detection tank T. In this case, the pressure in the process chamber 4 which is measured by the pressure sensor 6 should be integrated for flow verification.

(4) In the above embodiment, two gas lines 2A and 2B are provided; however, the flow verification system 16 may be applied to a gas supply system with one gas line or three or more gas lines.

(5) In the above embodiment, when the mass flow controller (8A, 8B) is installed in the gas line (2A, 2B), an integrated pressure value is calculated by following the flow verification procedure and the calculated integrated pressure value is stored in the benchmark storage device 27. Alternatively, a benchmark may be stored in the benchmark storage device 27 in advance.

(6) In the above embodiment, in flow verification, the controller 14 controls operation of the first to third cutoff valves 7A, 7B, 9A, 9B, 10A, 10B, mass flow controllers 8A and 8B and vacuum pump 5. Alternatively, the host device 15 may control their operation.

(7) In the above embodiment, the user selects the "benchmark set mode" and the "flow verification mode." An alternative approach is that when a sensor detects installation of the mass flow controller (8A, 8B) in the gas line (2A, 2B) or on a similar occasion, the "benchmark set mode" is automatically started. Also, the "flow verification mode" may be automatically started when the semiconductor manufacturing equipment is started.

(8) In the above embodiment, in flow verification, the final cutoff valve 13 is closed, pressure variation in the detection tank T is detected using the pressure sensor 12 and an integrated pressure value is calculated. An alternative approach is that pressure values which have been measured by the pressure sensor 12 without closing the final cutoff valve 13 since the start of flow control are integrated and the calculated integrated pressure value is used for flow verification. In this case, the pressure measuring time should be time required for the pressure in the detection tank T to become stable. In this case as well, it is desirable that the pressure measuring time be determined for each gas line depending on the gas line length, process gas specific gravity and flow rate, using the measuring time adjusting device 35.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A flow verification system for verifying a flow rate in a gas piping system comprising:
 a first cutoff valve;

a flow control device installed downstream from the first cutoff valve;

a pressure sensor for measuring pressure downstream from the flow control device, the flow verification system being adapted to verify the flow (rate) based on the pressure measured by the pressure sensor;

a benchmark storage device for storing a benchmark which is calculated by integrating the pressure values measured by the pressure sensor during a normal operation of the flow control device;

an abnormality detection device for detecting an abnormal flow of process gas by integrating the pressure values measured by the pressure sensor to calculate a pressure integrated value and comparing the pressure integrated value with the benchmark when the process gas is supplied to the flow control device through the first cutoff valve, controlled in flow rate by the flow control device, and supplied to the pressure sensor; and a benchmark set mode setting device arranged to cause the pressure sensor to measure the pressure while the flow control device controls flow rate of the process gas when the flow control device is installed in the gas piping system, and cause the benchmark storage device to store, as the benchmark, the pressure integrated value calculated by integration of the measured pressure values.

2. The flow verification system according to claim 1, further comprising:

a plurality of gas lines each including the first cutoff valve and the flow control device and being connected to the pressure sensor; and a measuring time adjusting device for adjusting, in each gas line, a pressure measuring time during which pressure measured values necessary for verifying the flow rate are measured by the pressure sensor.

3. A flow verification system for verifying a flow rate in a gas piping system comprising:

a first cutoff valve;

a flow control device installed downstream from the first cutoff valve;

a pressure sensor for measuring pressure downstream from the flow control device, the flow verification system being adapted to verify the flow (rate) based on the pressure measured by the pressure sensor;

a benchmark storage device for storing a benchmark which is calculated by integrating the pressure values measured by the pressure sensor during a normal operation of the flow control device;

an abnormality detection device for detecting an abnormal flow of process gas by integrating the pressure values measured by the pressure sensor to calculate a pressure integrated value and comparing the pressure integrated value with the benchmark when the process gas is supplied to the flow control device through the first cutoff valve, controlled in flow rate by the flow control device, and supplied to the pressure sensor;

a second cutoff valve installed between the flow control device and the pressure sensor;

a final cutoff valve installed downstream from the pressure sensor, wherein just after the flow control device starts flow control, the integrated pressure value is calculated by integrating the pressure values measured by the pressure sensor between the second cutoff valve and the final cutoff valve; and a benchmark set mode setting device arranged to cause the pressure sensor to measure the pressure while the flow control device controls flow rate of the process gas when the flow control device is installed in the gas piping system, and cause the benchmark storage device to store, as the benchmark, the pressure integrated value calculated by integration of the measured pressure values.

4. The flow verification system according to claim 3, further comprising:

a plurality of gas lines each including the first cutoff valve and the flow control device and being connected to the pressure sensor; and a measuring time adjusting device for adjusting, in each gas line, a pressure measuring time during which pressure measured values necessary for verifying the flow rate are measured by the pressure sensor.

\* \* \* \* \*